INVENTOR.
Walter J. Greenleaf
BY Ralph Hammar
Attorney

# United States Patent Office 2,805,469
Patented Sept. 10, 1957

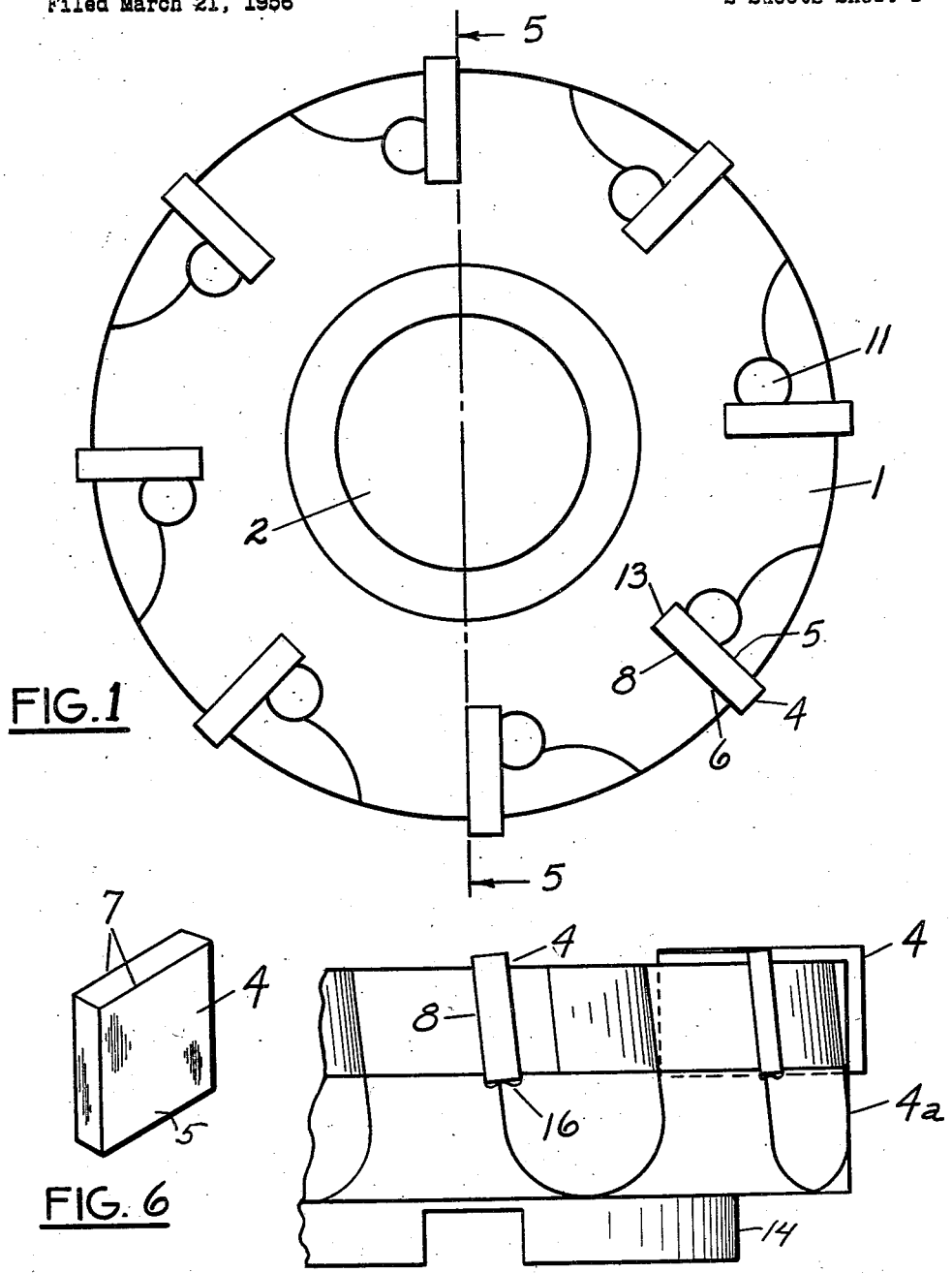

2,805,469
ROTARY CUTTING TOOL
Walter J. Greenleaf, Meadville, Pa.
Application March 21, 1956, Serial No. 572,964
1 Claim. (Cl. 29—105)

This invention is a milling cutter or similar rotary cutting or boring tool which uses clamped indexable bits of polygonal cross section, most commonly square or triangular with the end faces ground perpendicular to the longitudinal axes of the bits. When one of the cutting edges has become dull, a fresh cutting edge can be brought into cutting position by successively indexing the bit on its longitudinal axis and by turning the bit end for end until each side of the polygon at both ends of the bit has been brought successively into cutting position.

In such cutting tools there is a cutting thrust along the longitudinal axes of the bits and around the axis of the tool (circumferential thrust) and there are also cutting thrusts along the axis of the tool (axial thrust) and radial to the axis of the tool (radial thrust). The circumferential, axial and radial thrusts are at right angles to each other, the circumferential thrust being generally endwise and the axial and radial thrusts being generally edgewise of the bits.

In the present construction the body of the cutter has radially extending seats for the ends of the bits which support the bits and take the circumferential thrust and at the inner edges of the seats are axially extending seats which take the radial thrust. A ring fixed to the body has radially extending seats which take the axial thrust. The radially extending seats on the ring and the axially extending seats on the body also cooperate to locate the bits precisely so the cut does not change as the bits are indexed. With this construction all seats can be easily machined and precision ground after hardening.

Figures 3, 4:
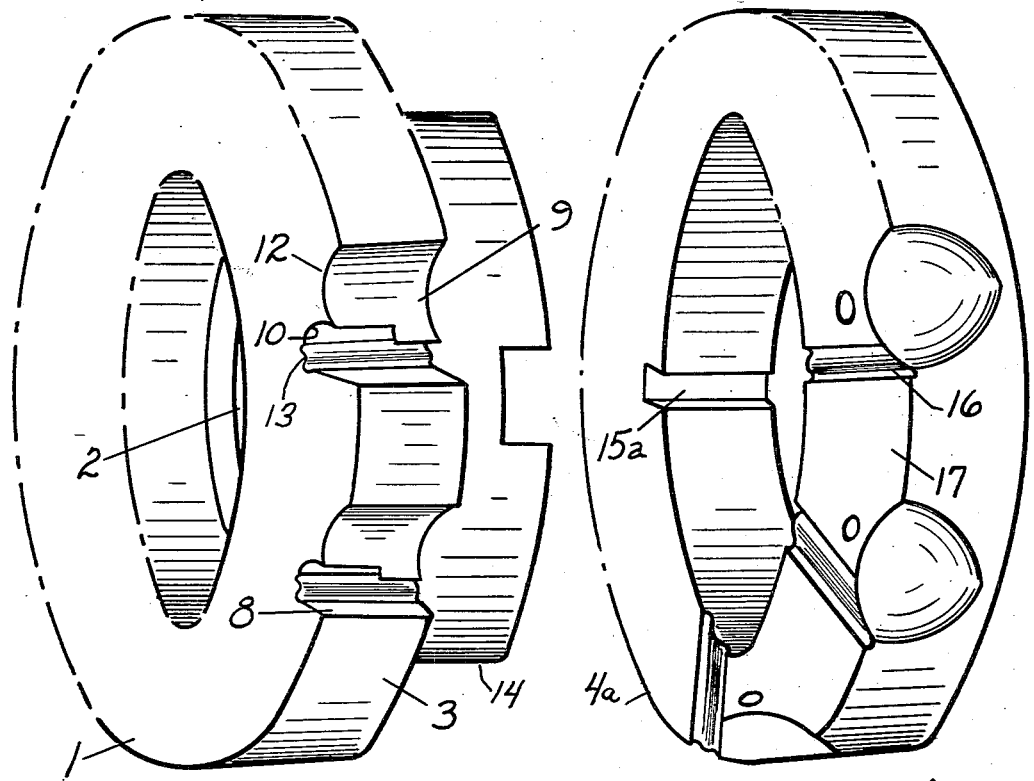
Figure 5:
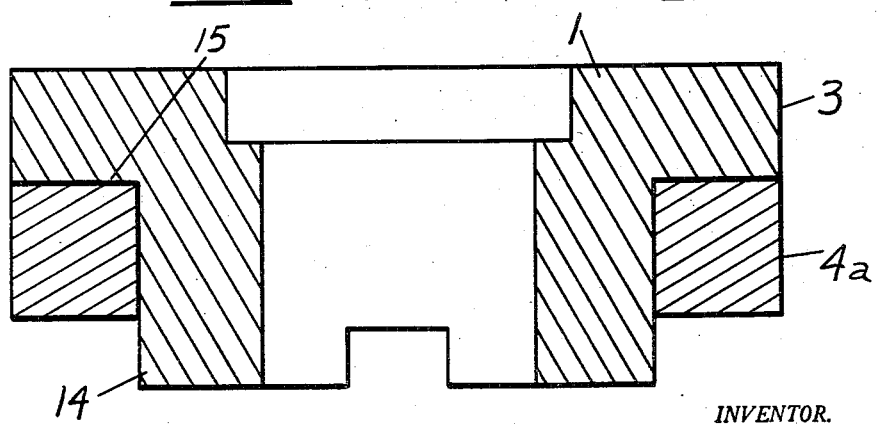

In the accompanying drawing, Fig. 1 is an end view of a milling cutter, Fig. 2 is an edge view, Fig. 3 is a perspective of the body of the cutter, Fig. 4 is a perspective of the ring, Fig. 5 is a section on line 5—5 of Fig. 1, and Fig. 6 is a perspective of a square bit.

In the drawing, 1 indicates the body of a milling cutter having at its center an arbor hole 2 by which the cutter is fastened to a spindle. Around the rim 3 of the body are circumferentially spaced bits 4 which are illustrated as of square section but which may be of any other suitable polygonal section. The bits are of the short or thin type which are intended to be used once and then thrown away. The bits have end faces 5 which are ground perpendicular to the length of the bits and which provide at the intersection of the end faces of the bits with the sides of the bits as many cutting edges as there are sides to the bits. For the square bit shown in Fig. 6, there are eight cutting edges 7.

Since the end faces 5 and 6 of the bits are perpendicular to the longitudinal axes of the bits, the necessary cutting clearance is provided by inclination of the seats 8, which, as shown in Figs. 1 and 2, are inclined axially. The seats 8 are machined into the rim 3 at one side of notches 9 which extend clear across the rim. The other sides of the notches 9 have grooves 10 for receiving the conventional jack lock wedges 11 and also have arcuate surfaces 12 which provide chip clearance. The grooves 10 can easily be formed by drilling. The surfaces 12 extend clear across the rim and are easily machined. Adjacent the inner edge of the seats 8 are axially extending seats 13 which also extend clear across the rim and which engage the inner edges of the bits 4. When the bits 4 are clamped against the seats 6 by the jack lock wedges 11, the seats 8 take the circumferential thrust and the seats 13 take the radial thrust. The seats 8 and 13 can be surface ground after the body of the cutter is hardened, thereby providing true and accurate surfaces which precisely locate the bits so that as the bits are indexed, either by rotation about their longitudinal axes or by turning end for end, the relative position of the cutting edges will not change. This is particularly important in milling cutters where all of the cutters would have the same relative position to avoid overloading individual cutters.

The ring 4a which telescopes over the hub 14 of the body of the cutter and is keyed to the body of a keyway 15a and abuts the rear face 15 of the body and has formed therein radial seats 16 which extend across the face 17 of the ring 4a and are positioned so as to form with the seats 13 right angled bit locating notches when the ring 4a is secured to the body of the cutter. Of course if the bit 4 were of other shape, the seats 16 would not necessarily be at right angles to the seats 13. The function of the seats 13 and 16 is to engage sides of the bits and to locate the bits on the seat 8 so that as the bits are indexed, the position of the cutting edges will not change.

The cutter is much cheaper to make than other cutters where the notches are formed directly in the body. The cost of the bits for the cutter which (for the square bits shown) give eight cutting edges is less than the cost of grinding and setting up conventional bits having only a single cutting edge.

It will be noted that the seats 13 and 16 which engage and locate the edges of the bits are crowned rather than flat and engage the edges of the bits intermediate the ends. The edge support of the bits is accordingly clear of the cutting edges. The bits are much thicker edgewise than lengthwise so flat seats are not necessary to support the edges. Also, the edgewise thrust, either radial or axial, is smaller than the circumferential thrust taken by the end seats 8.

By having the seats 8 radial, the cutting clearance is determined by the thickness of the bits. Because the larger diameter cutters require thicker bits, it is possible when the bits of a large diameter cutter are worn to grind the ends of the bits thereby reducing the thickness of the bits so as to permit use on smaller diameter cutters. This grinding can be easily done by a surface grinder.

What is claimed as new is:
1. In a milling cutter, a body having a cylindrical surface concentric with the axis of the cutter and extending axially inward from the rear end of the body, a ring having a complementary cylindrical surface, the ring and body being telescoped together and the ring being removable by sliding off said rear end of the body, a rim at the front of the body extending radially outside said cylindrical surface, a plurality of circumferentially spaced tangentially extending polygonal bits around the axis of rotation of the body with the longitudinal axes of the bits inclined to provide cutting clearance, each bit having end faces normal to the length of the bit, one of which provides a seating surface and the other of which provides a cutting surface and having sides normal to the end faces, a plurality of circumferentially spaced open ended grooves extending through the rim from front to back, each groove having one side normal to the length and engaging one end of a bit and providing an end seat for the bit, a side seat at the bottom of each groove parallel to and engaging one of the polygonal sides of the bit, the seats in each groove being machinable and grindable by straight passes across the rim, clamping means engaging the other end of each bit and clamping it endwise against its end seat, said ring having a section adjacent the rim and closing the back end of the grooves, a plurality of seats in said section of the ring corresponding to the side seats in the rim, each of the seats in the ring diverging from the bottom of a groove in the rim and being parallel to and engaging another of the polygonal sides of the bit and providing a side seat for the bit, each seat in the ring being unobstructed at each end and machinable by straight passes across the ring, said side seats on the rim and ring cooperating to form a notch locating the bits as they are indexed to bring fresh cutting edges into cutting position.

References Cited in the file of this patent

UNITED STATES PATENTS

| | | |
|---|---|---|
| 1,927,409 | Markstrum | Sept. 19, 1933 |
| 2,524,301 | Bauer | Oct. 3, 1950 |
| 2,690,610 | Begle | Oct. 5, 1954 |

FOREIGN PATENTS

| | | |
|---|---|---|
| 597,438 | Great Britain | Jan. 26, 1948 |
| 667,936 | Great Britain | Mar. 12, 1952 |
| 695,778 | Great Britain | Aug. 19, 1953 |